(12) United States Patent
Hall et al.

(10) Patent No.: US 12,295,380 B2
(45) Date of Patent: *May 13, 2025

(54) METHOD FOR CREATING SMOKED FOODS AND BEVERAGES

(71) Applicant: Brain Brew Ventures 3.0, Inc., Newtown, OH (US)

(72) Inventors: Douglas B. Hall, Newtown, OH (US); Joseph M. Girgash, Newtown, OH (US); James J. Beaupre, Glenburn, ME (US)

(73) Assignee: Brain Brew Ventures 3.0, Inc., Newtown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,517

(22) Filed: Jan. 11, 2024

(65) Prior Publication Data

US 2024/0138427 A1    May 2, 2024

Related U.S. Application Data

(60) Continuation of application No. 17/321,926, filed on May 17, 2021, now Pat. No. 12,011,008, which is a division of application No. 16/307,687, filed as application No. PCT/US2017/036217 on Jun. 6, 2017, now Pat. No. 11,076,608.

(60) Provisional application No. 62/346,478, filed on Jun. 6, 2016.

(51) Int. Cl.
  *A23B 4/052*    (2006.01)
  *A23B 4/044*    (2006.01)
  *A47J 37/07*    (2006.01)

(52) U.S. Cl.
  CPC .............. *A23B 4/052* (2013.01); *A23B 4/044* (2013.01); *A47J 37/0754* (2013.01)

(58) Field of Classification Search
  CPC .... A47J 37/0754; A23B 4/052; A23B 4/0523; A23B 4/044
  USPC ............................................................ 99/482
  See application file for complete search history.

(56) References Cited

U.S. PATENT DOCUMENTS

| | | |
|---|---|---|
| 889,828 A | 6/1908 | Trescott |
| 1,017,647 A | 2/1912 | Burton |
| 1,068,272 A | 7/1913 | Rayson |
| 1,964,372 A | 6/1934 | Tygart |
| 2,266,131 A | 12/1941 | Christian |
| 3,521,549 A | 7/1970 | Funke |
| 3,943,841 A | 3/1976 | Huang |
| 4,932,272 A | 6/1990 | Sternin et al. |
| 5,484,619 A | 1/1996 | Yamaoka et al. |
| 5,713,267 A | 2/1998 | Wilson |

(Continued)

FOREIGN PATENT DOCUMENTS

| | | |
|---|---|---|
| CN | 102078007 B | 5/2013 |
| DE | 2618226 A1 | 11/1977 |

(Continued)

OTHER PUBLICATIONS

Partial Supplementary European Search Report for EP 17810890.8, dated Jan. 27, 2020, pages.

(Continued)

*Primary Examiner* — Reginald Alexander
(74) *Attorney, Agent, or Firm* — Frost Brown Todd LLP; Alexander J. Johnson

(57) ABSTRACT

The present invention is a method and system for making smoke beverages and foods using multiple condensation stages.

13 Claims, 1 Drawing Sheet

(56) References Cited

U.S. PATENT DOCUMENTS

| | | |
|---|---|---|
| 5,972,401 A | 10/1999 | Kowalski |
| 6,681,686 B1 | 1/2004 | Chiu |
| 2009/0136638 A1 | 5/2009 | Fujie |
| 2012/0132082 A1 | 5/2012 | Baird et al. |
| 2012/0164300 A1 | 6/2012 | Niazi |

FOREIGN PATENT DOCUMENTS

| | | |
|---|---|---|
| DE | 3826211 A1 | 8/1988 |
| GB | 2305846 A | 4/1997 |
| JP | S 5912112 A | 1/1984 |
| JP | S 60 31813 B2 | 7/1985 |
| JP | S 60 216820 A | 10/1985 |
| JP | S 62139285 U | 9/1987 |
| JP | H 0292503 A | 4/1990 |
| JP | H 04145009 A | 5/1992 |
| JP | H 09207954 A | 8/1997 |
| JP | 2001524325 A | 12/2001 |
| JP | 2002065239 A | 3/2002 |
| JP | 3094680 U | 7/2003 |
| JP | 2004016020 A | 1/2004 |
| JP | 2005013183 A | 1/2005 |
| JP | 2006070234 A | 3/2006 |
| JP | 2011160784 A | 8/2011 |
| JP | 2013081443 A | 5/2013 |
| JP | 2015202105 A | 11/2015 |
| KR | 1020090027692 A | 3/2009 |
| WO | WO 9920117 A1 | 4/1999 |
| WO | WO 9927794 A1 | 6/1999 |

OTHER PUBLICATIONS

International Search Report and Written Opinion for PCT/US17/36217 mailed , pages.
JP 2019-516101 Notice of Reasons for Refusal dated Nov. 25, 2020, 5 pages.
KR 20197000346 Decision on Registration dated Nov. 17, 2022, 3 pages.

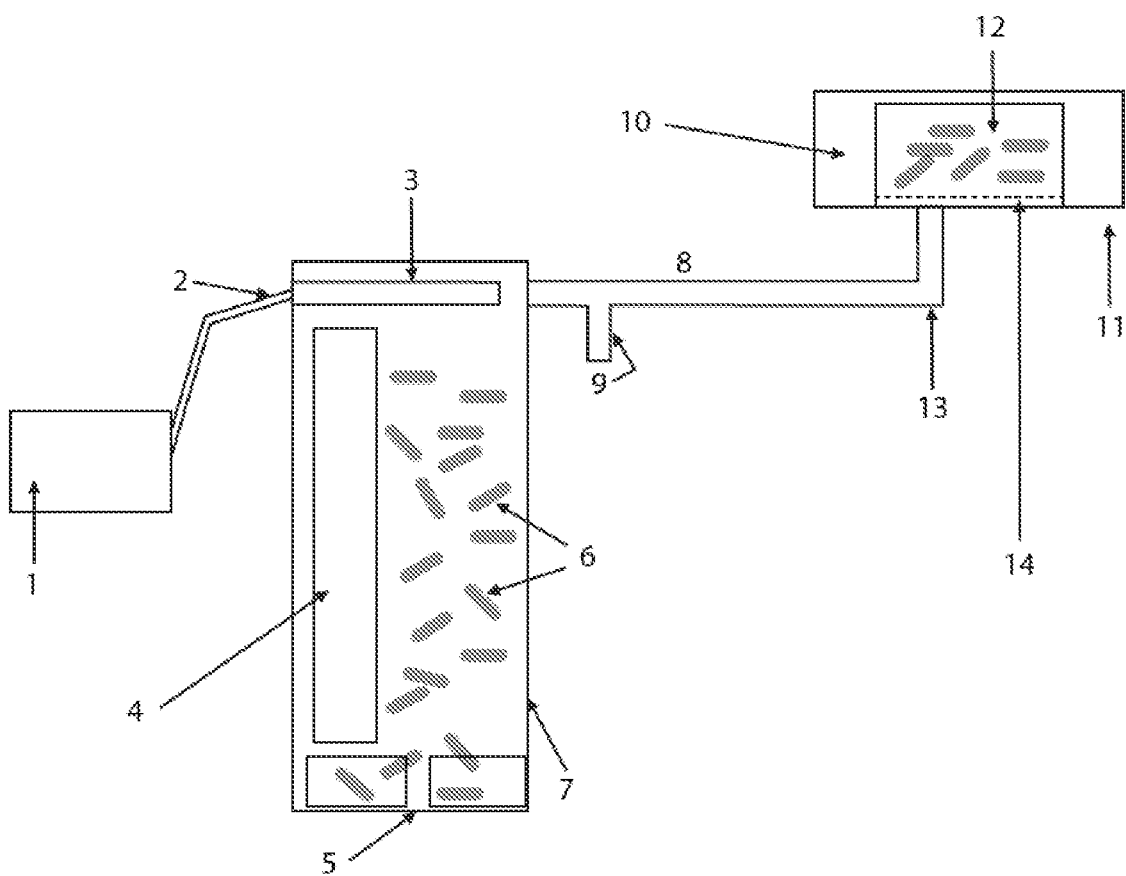

METHOD FOR CREATING SMOKED FOODS AND BEVERAGES

CROSS-REFERENCE TO RELATED APPLICATION

The present application is a continuation application of U.S. patent application Ser. No. 17/321,926, filed May 17, 2021, which is a division of U.S. patent application Ser. No. 16/307,687, filed Dec. 6, 2018, which is a 371 of International Application No. PCT/US2017/036217, which claims priority to provisional U.S. Patent Application No. 62/346,478, filed Jun. 6, 2016, all of which are hereby incorporated by reference in their entireties.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to food products. More particularly, the present invention is a method for created smoked foods and beverages.

2. Description of Background and Relevant Information

Smoked foods have long been a staple in diets of many cultures. However, traditional smoking can be a long process that can be difficult to regulate for consistency, and can impart some less desirable flavors from smoke that has not undergone multiple stages of condensation prior to reaching the food.

What is desired, though, is a system that can impart very bold smoky flavors without any of the undesirable flavors that can be imparted to the food or beverage using traditional smoking methods.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 1 is an illustration of a particular embodiment of the present invention.

DESCRIPTION OF THE REFERENCED NUMERALS

In reference to the drawings, similar reference characters denote similar elements throughout all the drawings. The following is a list of the reference characters and associated element:

1 Air pump
2 Air line
3 Air pipe
4 Spring or perforated pipe
5 Air intake vents
6 Wood Pellets
7 Container
8 Outward Pipe
9 Drain
10. Space for cooling means
11. Outer Pot
12. Holder
13. Outward Pipe End
14. Screen

DESCRIPTION OF THE INVENTION

The present invention is a multi-stage smoke condenser and capture device for producing smoked foods and beverages. The device is comprised of a means for generating smoke and a holder directly connected to the means for generating smoke. The holder is a closed system and includes a first chamber within the holder for condensation of some of the smoke entering the holder, and a second chamber for absorption of pre-condensed smoke on a flavor carrier, where the flavor carrier is wood chips, zeolite (microporous, aluminosilicate minerals commonly used as commercial adsorbents and catalysts), food, or a combination there.

In an exemplary embodiment, the multi-stage device may also include a pipe between the means for generating smoke and the holder. A cooling means, such as a glycol line, ice, cold water, etc. may be positioned to interact with the pipe and thereby bring down the temperature inside the pipe.

And the multi-stage device may also have a means for removing condensation from a pipe between the means for generating smoke and the holder. Such a means for removing condensation may be a drain, a valve, or a trap.

FIG. 1 provides an exemplary embodiment of a specific variation on the present invention.

The device includes a container in which wood pellets are placed. The container has air intake vents at the bottom portion of the container. Within the container itself there may be a spring or perforated pipe that allows eventual smoke to rise up towards the top of the container.

Towards the top of the container there is an air line coming into the container via an inlet. The inlet and air line may connect to an air pipe in the top region of the container. The air pipe is connected to an air pump that blows air into the container via the inlet and into the air pipe, when present. The option air pipe preferably does not extend all the way across the container.

Preferably opposite the inlet, but in the upper portion of the container nonetheless, is an outlet. It is preferred that the air pipe, when present be directed towards the outlet but with open space between the end of the air pipe and the outlet.

Wood pellets or other combustibles may be placed within the container. The wood pellets are lit through air intake vents at the bottom of the container. As the wood pellets burn, the smoke is directed upward towards the top of the container where the air pumped in through the air line directs the smoke towards the outlet of the container.

The outlet of the container is connected to an outward pipe that then connects to the bottom side of an outer pot. It is preferred that the outer pot have a lid or other similar means of enclosing the contents of the outer pot.

Thus far, the description of FIG. 1 illustrates an exemplary means for generating smoke.

The outward pipe may be of varying lengths and shapes based on the type of smoke that one wishes to capture. For the present invention's examples, it has thus far been found that having the outward pipe have a length at least equal to or greater than 1.5 times the height of the container.

The outward pipe may have a drain or other means for removing condensation at a distance closer to the container than the outer pot, and in this exemplary embodiment within a distance of 10% to 50% of the entire length of the outward pipe. When open, the drain is an outlet for oils and condensation within the outward pipe to be removed without spilling back into the container and putting out the burning wood pellets. The drain also helps keep the outward pipe unclogged.

After the outer pot, the outward pipe connects into a holder positioned within the outer pot. Like the outer pot, the holder preferably has a lid or other similar means of enclosing the contents of the holder.

There is a hole at the bottom of the holder through which the outer pipe is connected. Above the hole there is a liquid and gas permeable screen that spans the cross-sectional area of the holder. And in this illustrative exemplary embodiment, the screen is located above the bottom of the holder at a distance of at least 10% of the entire height of the inside of the holder.

The holder described has two chambers separated by the screen. This merely one of multiple ways to illustrate this invention, however.

Wood pellets or other combustibles are placed within the container and lit via the air intake vents. As the pellets burn, the resulting smoke drifts towards the top of the container and is directed out through the outlet and into the outward pipe. The air being fed into the container from the air pump assists in directing the smoke in this direction.

The smoke starts to condense within the outward pipe as the outward pipe is cooler than the container. Some of the condensation from the smoke in the outward pipe may be removed via the drain.

The smoke that doesn't condense within the outward pipe continues upward into the holder. The space between the inside of the outer pot and the outside of the holder includes a cooling means in the form of ice, water, cooled air, glycol line, or an ice bath. In a preferred embodiment, the cooling means is ice or an ice bath.

Wood chips, for example, are placed within the holder and above the screen. As the smoke enters the holder and through the screen, the smoke may be imparted to the flavor carrier, here as wood chips. Smoke that condenses within the holder may flow to the bottom of the holder and/or back down the outer pipe. And any condensation may also collect under the screen in the holder.

The smoke flavor which then can be imparted to beverages or foods directly, or indirectly by way of using the flavor carrier such as wood chips or zeolite, for example, which are saturated with clean smoke which can the extracted through proprietary and known methods.

In an alternative method, the chips in the holder are replaced with a particular food or beverage to directly absorb the smoke.

One of the uses of the wood chips with the imparted smoke is for use in the distilled spirits industry in order to impart a smoky flavor to a spirit such as whiskey, bourbon, rum, etc. The wood chips with the imparted smoke are introduced to the distilled spirit in methods known to those of ordinary skill in the art.

Embodiment 1

A distilled spirit, a rum, was made using wood chips with smoke imparted to the wood chips by a commercially known device where the smoke from what would be similar to the present container is fed directly into a holder surrounded by ice and an outer pot.

Embodiment 2

A second distilled spirit, a rum, was made using wood chips in a device according to the presently claimed invention.

The rum of EMBODIMENT 1 and that of EMBODIMENT 2 were tested in a paired comparison blind test. It was tested with a random sample of 21 to 39 year old Americans.

After the testing, it was found that the rum of EMBODIMENT 1 generated a purchase intent sure of 4.6 on a 0 to 10 scale, where 0 is "definitely not buy" and 10 is "definitely would buy." On the same scale, the rum of EMBODIMENT 2 generated a purchase intent of 6.1.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

The invention claimed is:

1. A multi-stage smoke condenser and capture device, the device being comprised of:
    a container for generating smoke including air intake vents at a bottom portion thereof and both an inlet and an outlet opposite one another at an upper portion thereof;
    a holder spaced from the container for generating smoke;
    an outward pipe connected to the outlet for spacing the holder from the container for generating smoke; and
    an air pump connected via an air line to the inlet of the container for generating smoke; wherein the holder is a closed system and includes a first chamber within the holder for condensation of some of the smoke entering the holder, a second chamber for absorption of pre-condensed smoke on a flavor carrier, and a liquid and gas permeable screen within the holder, wherein the liquid and gas permeable screen separates the first chamber from the second chamber.

2. The multi-stage device according to claim 1 further comprising a cooling device for decreasing the overall temperature of the holder.

3. The multi-stage device according to claim 1 further comprising a cooling device in the outward pipe.

4. The multi-stage device according to claim 1 further comprising an exit for removing condensation from the outward pipe.

5. The multi-stage device according to claim 4, wherein the exit for removing condensation may be a drain, a valve, or a trap.

6. The multi-stage device according to claim 1, wherein the flavor carrier is wood chips, zeolite, or food.

7. A method for imparting smoke flavor to a flavor carrier, the method being comprised of the steps of:
    generating smoke in a container including air intake vents at a bottom portion thereof and both an inlet and an outlet opposite one another at an upper portion thereof;

directing the generated smoke into a holder spaced from the container, wherein an outward pipe connected to the outlet spaces the holder from the container, wherein an air pump connected via an air line to the inlet of the container pushes the generated smoke from the container to the holder, wherein the holder includes a first chamber within the holder for condensation of some of the smoke entering the holder, a second chamber for absorption of pre-condensed smoke on a flavor carrier, and a liquid and gas permeable screen within the holder, wherein the liquid and gas permeable screen separates the first chamber from the second chamber.

8. The method according to claim 7, further comprising cooling the overall temperature of the holder.

9. The method according to claim 7, further comprising cooling the outward pipe.

10. The method according to claim 7, further comprising removing condensation from the outward pipe.

11. The method according to claim 10, wherein the condensation is removed via a drain, valve, or trap.

12. The method according to claim 7, wherein the flavor carrier is at least one of wood chips, zeolite, and food.

13. The method according to claim 12, wherein the flavor carrier is wood chips that are subsequently used to provide smoke flavor to distilled spirits.

* * * * *